US011373003B2

(12) United States Patent
Kihneman et al.

(10) Patent No.: US 11,373,003 B2
(45) Date of Patent: Jun. 28, 2022

(54) MITIGATING INADVERTENT USER INFORMATION COLLECTION IN TELEMETRY DATA

(71) Applicant: Microsoft Technology Licensing, LLC, Redmond, WA (US)

(72) Inventors: Brian Eugene Kihneman, Bellevue, WA (US); Eric L. Smith, Duvall, WA (US); Dolly Sobhani, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 16/671,906

(22) Filed: Nov. 1, 2019

(65) Prior Publication Data
US 2021/0133347 A1 May 6, 2021

(51) Int. Cl.
*G06F 9/44* (2018.01)
*G06F 21/62* (2013.01)
*G06F 11/36* (2006.01)
*G06F 11/34* (2006.01)

(52) U.S. Cl.
CPC ...... *G06F 21/6245* (2013.01); *G06F 11/3438* (2013.01); *G06F 11/3476* (2013.01); *G06F 11/366* (2013.01)

(58) Field of Classification Search
None
See application file for complete search history.

(56) References Cited

U.S. PATENT DOCUMENTS

| 6,434,512 B1 * | 8/2002 | Discenzo | F16C 19/52 714/798 |
| 8,875,284 B1 | 10/2014 | Newstadt et al. | |
| 9,003,378 B2 | 4/2015 | Liberty et al. | |

(Continued)

OTHER PUBLICATIONS

"Removing PII From Your Google Analytics Implementation", Retrieved from: https://www.adswerve.com/blog/removing-pii-from-your-google-analytics-implementation/, Retrieved Date: Jun. 14, 2019, 3 Pages.

(Continued)

*Primary Examiner* — Qamrun Nahar
(74) *Attorney, Agent, or Firm* — Scott Y. Shigeta; Newport IP, LLC

(57) ABSTRACT

Aspects of the present disclosure relate to techniques for mitigating inadvertent user information collection in telemetry data. In examples, user information is used to evaluate telemetry data associated prior to transmission to a server device. If an instance of user information is identified within the telemetry data, a warning indication is generated. The warning indication may be transmitted to the server device either instead of or in combination with the telemetry data. As a result of the warning indication, the software may be modified to resolve the issue that caused the introduction of the user information into the telemetry data, thereby avoiding future instances of inadvertent data collection. In response to the warning indication, the server may be configured to reject similar telemetry data from other devices, thereby avoiding collecting such data from the other devices. The server device may also use the warning indication to remove or otherwise censor previously collected user information from stored telemetry data.

20 Claims, 9 Drawing Sheets

(56) References Cited

U.S. PATENT DOCUMENTS

| | | | |
|---|---|---|---|
| 9,262,147 | B1 | 2/2016 | Gutnik et al. |
| 9,355,273 | B2 | 5/2016 | Stevens et al. |
| 9,736,210 | B2 | 8/2017 | Root et al. |
| 10,079,842 | B1 * | 9/2018 | Brandwine ......... H04L 63/1425 |
| 2014/0298107 | A1 | 10/2014 | Dreyfoos et al. |
| 2015/0149362 | A1 | 5/2015 | Baum et al. |
| 2019/0146897 | A1 * | 5/2019 | Malton ............... G06F 11/3608 717/131 |
| 2019/0294485 | A1 * | 9/2019 | Kukreja ............. G06F 11/0775 |
| 2020/0136937 | A1 * | 4/2020 | Savalle ................ H04L 43/065 |

OTHER PUBLICATIONS

Simpson, et al., "Configure Windows diagnostic data in your organization", Retrieved from: https://docs.microsoft.com/en-us/windows/privacy/configure-windows-diagnostic-data-in-your-organization, Apr. 29, 2019, 20 Pages.

* cited by examiner

MITIGATING INADVERTENT USER INFORMATION COLLECTION IN TELEMETRY DATA

BACKGROUND

Software developers use telemetry data for a variety of purposes, including identifying unintended software behavior, evaluating how existing software features are used, and studying customer needs to identify potential new features, among other examples. However, telemetry data may inadvertently include user information, which may have little to no value for software evaluation purposes and may instead be private in nature. Avoiding or correcting for the inadvertent collection of user information in telemetry data is difficult, especially when it is challenging to identify event the existence of such user information within the telemetry data.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to techniques for mitigating inadvertent user information collection in telemetry data. In examples, a set of user information is used at a client device to evaluate telemetry data associated with software prior to transmission of the telemetry data to a server device. If an instance of user information is identified within the telemetry data, a warning indication is generated. The warning indication may comprise an indication as to the type of user information that was identified, as well as diagnostic information usable to identify which aspect of the software caused the user information to be included in the telemetry data. The warning indication may be transmitted to the server device either instead of or in combination with the telemetry data. As a result of the warning indication, the software may be modified to resolve the issue that caused the introduction of the user information into the telemetry data, thereby avoiding future instances of inadvertent data collection.

In response to the warning indication, the server may be configured to reject similar telemetry data from other devices, thereby avoiding collecting such data from the other devices. As another example, the server device may use the warning indication to identify user information within previously collected telemetry data, and may remove or otherwise censor the user information from the stored telemetry data. Thus, not only are potential user information issues mitigated at the client-side, but the server device is also able to use the warning indication to reduce or avoid the collection of new user information and to more effectively censor existing telemetry data.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
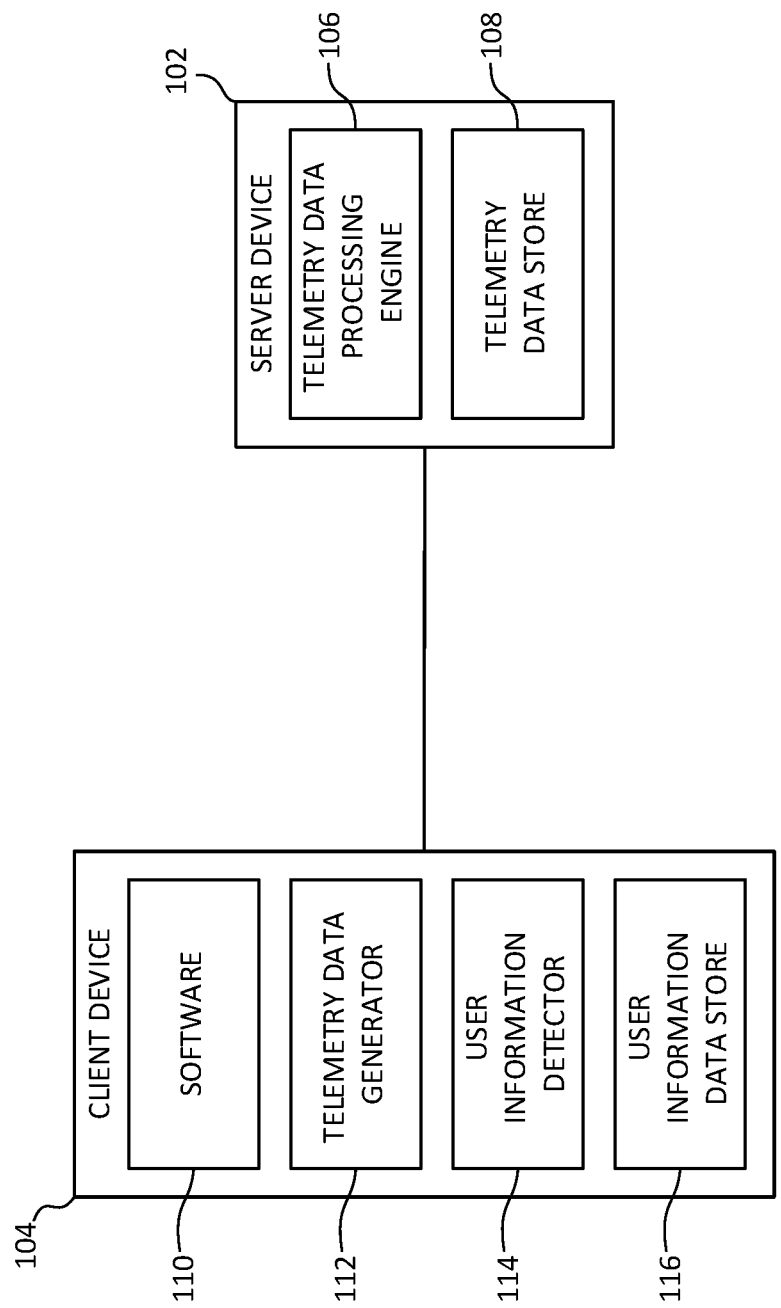
FIG. 1 illustrates an overview of an example system for mitigating inadvertent user information collection in telemetry data.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, telemetry data provides insight into the performance and uses of software. In examples, telemetry data may only be collected if the user opts in to such data collection. In other examples, required telemetry data may be collected (e.g., relating to product security, updates, and product performance, etc.) in addition to enabling a user to opt in to additional telemetry data collection (e.g., relating to anonymized usage habits, etc.). A server may aggregate telemetry data from multiple client devices, after which the telemetry data may be analyzed accordingly. However, given the variability of computer software functionality and the many types information that may be included as part of telemetry data, user information may be inadvertently collected therein. Further, it is difficult to identify and censor user information, especially if the analysis is performed at a server after the telemetry data has left the client device at which it was generated. For example, user information is user- or device-specific, such that it may vary among users and/or devices, thereby complicating the potential to use a generic approach for the detection of user information. Given that user information may provide little to no diagnostic value at best, or at worst may pose potential security issues, privacy concerns, or even legal liability, it is preferable to avoid or limit the collection of user information altogether. Further, there is a need to identify mechanisms by which user information is included in telemetry data so such issues may be resolved, thereby enabling the removal of potential avenues by which user information is incorporated into telemetry data.

Accordingly, aspects of the present disclosure relate to techniques for mitigating inadvertent user information collection in telemetry data. In examples, a set of user information is maintained at a client device, which comprises any of a variety of types of user information (e.g., associated with the user, with the device, etc.). In examples, information in the set is further associated with a user information type. Accordingly, the user information is used to evaluate telemetry data (e.g., as the telemetry data is generated, after generation but prior to transmission to a server device, etc.) to determine whether the telemetry data comprises any instances of user information. If user information is determined to exist within the telemetry data, a warning indication is generated, which indicates that user information was identified in the telemetry data. For example, the indication comprises diagnostic information usable to identify what caused the user information to be included in the telemetry data (e.g., a stack trace, a software version, a software name, an execution time, etc.), as well as an indication as to the type of user information that was included.

The warning indication is provided to a server device (e.g., associated with the developer of the software, associated with a third party service, etc.), which may be used by the software developer to resolve the issue. As a result, the software may no longer inadvertently collect user information when generating telemetry data in the future, thereby avoiding potential issues associated with doing so. Further, the telemetry data need not be censored (e.g., by removing user information, replacing user information, hashing user information, etc.) after receipt at the server device. In examples, it is preferable to avoid the need to censor telemetry data at the server device, as such techniques have limited effectiveness due to the variability of user information paired with the lack of knowledge at the server device regarding the form, type, and location of user information. Further, server-side approaches may present scalability issues as compared to the client-side aspects described herein. Finally, while it is preferable to identify all telemetry data generation issues prior to release, it may be difficult to identify and test all instances in which telemetry data is generated without subjecting the software to a variety of different use cases and execution environments.

In another example, the server device uses the warning indication to process user information that may exist in previously collected telemetry data. In examples where the warning indication comprises a type of user information, existing telemetry data may be analyzed according to a pattern associated with the user information type (e.g., matching an email address, a mailing address, a computer host name, etc.) to remove or otherwise censor any inadvertently collected user information. As an example, identified user information may be replaced with an indication as to the type of user information, or the identified user information may be omitted. It will be appreciated that alternative techniques may be used to process existing telemetry data. For example, the warning indication may comprise an indication as to a location at which customer identification is located (e.g., according to a line number, a column number, a pattern of characters, etc.), which may be used to process the telemetry data accordingly.

In some instances, the client does not transmit the telemetry data as a result of identifying the user information in the telemetry data, thereby ensuring that telemetry data comprising user information is not received and stored by the server device. In such instances, the warning indication is transmitted while the associated telemetry data is not. In another example, the telemetry data may be transmitted in combination with the warning indication. In other examples, the warning indication may cause the server device to be configured to reject telemetry data based on the warning indication, such that telemetry data is not accepted and stored by the server device from software known to inadvertently collect user information. As another example, the server device may be configured to dynamically scrub telemetry data on receipt based on the received warning indication. While example actions are described herein, it will be appreciated that any of a variety of other actions may be performed based on determining telemetry data comprises user information. Further, in some examples, multiple actions may be performed.

As used herein, telemetry data includes, but is not limited to, information regarding how often or in what way various software features are used, software start-up time, processing time associated with various tasks, computing device hardware specification information, software execution state information (e.g., a stack trace, computer uptime, available computing resources, a list of relevant or other software executing on the computing device, etc.), and/or general usage statistics. Further, example user information includes, but is not limited to, account information (e.g., a username, an email address, a mailing or billing address, payment information, user browsing history, etc.), network information (e.g., a hostname, an Internet Protocol (IP) address, a medium access control (MAC) address, etc.), or file information (e.g., a path, a file name, at least a subset of file content, etc.). It will be appreciated that user information may comprise any of a variety of other information, such as information considered to be personally identifiable information (PII) under the General Data Protection Regulation (GDPR).

FIG. 1 illustrates an overview of an example system 100 for mitigating inadvertent user information collection in telemetry data. As illustrated, system 100 comprises server device 102 and client device 104. In examples, server device 102 and client device 104 communicate using a network, such as a local area network, a wireless network, or the Internet, or any combination thereof. In an example, server device 102 is a computing device, including, but not limited to, a desktop computing device or a distributed computing device. In other examples, client device 104 is any of a variety of computing devices, including, but not limited to, a mobile computing device, a laptop computing device, a tablet computing device, or a desktop computing device. It will be appreciated that while system 100 is illustrated as comprising one server device 102 and one client device 104, any number of devices may be used in other examples. Further, the functionality described herein with respect to server device 102 and client device 104 may be distributed among any number of computing devices in other examples.

Server device 102 is illustrated as comprising telemetry data processing engine 106 and telemetry data store 108. In examples, telemetry data processing engine 106 receives telemetry data from one or more client devices (e.g., client device 104) and stores the received telemetry data in telemetry data store 108. In some instances, telemetry data processing engine 106 evaluates a block list or a set of rules to determine whether to accept and store telemetry data received from a client. For example, the block list or set of rules may be updated in response to a received warning indication, thereby enabling telemetry data to be blocked if the telemetry data is believed to comprise inadvertently collected user information. The telemetry data may also be dynamically modified to omit or otherwise sensor user information according to the warning indication according to aspects described herein. In other examples, telemetry data processing engine 106 processes telemetry data stored by telemetry data store 108 to generate analytics. Telemetry data processing engine 106 may further process previously received telemetry data based on the warning indication to censor user information according to aspects described herein. Telemetry data store 108 may store telemetry data according to the software with which it is associated (e.g., according to an identifier, a version number, a developer, etc.), a software version number, or any of a variety of other identifying information associated with software for which the telemetry data was collected.

As illustrated, client device 104 comprises software 110, telemetry data generator 112, user information detector 114, and user information data store 116. In examples, software 110 may be a native application executing on client device 104, a website or a web-based application, a software library used by one or more software applications, or an operating system or a component thereof. It will be appreciated that while example software is described herein, any of a variety of other software may be used in other examples.

Telemetry data generator 112 generates telemetry data relating to software 110 on client device 104, including, but not limited to, information regarding how often or in what way software features of software 110 are used, start-up time or processing time associated with software 110, hardware specification information of client device 104, execution state information associated with software 110, and/or general usage statistics. Accordingly, telemetry data generator 112 may provide generated telemetry data to server device 102 (e.g., telemetry data processing engine 106).

User information detector 114 evaluates telemetry data generated by telemetry data generator 112 to determine whether it contains user information. In examples, user information detector 114 accesses user information from user information data store 116 and uses the accessed user information to identify instances of user information within telemetry data. In examples, user information data store 116 comprises a set of user information items for client device 104. As described above, example user information includes, but is not limited to, account information for a user of client device 104, network information associated with client device 104, or file information for files stored by or accessed from client device 104, among other examples. User information may comprise any of a variety of other information, such as information considered to be PII under the GDPR. In an example, the types of user information that are stored in user information data store 116 are defined by server device 102 and may be remotely updated accordingly.

In some instances, user information stored by user information data store 116 may be updated by user information detector 114. For example, the user information may be periodically updated according to a predetermined time period and/or may be updated in response to one or more events (e.g., the creation of a new user account, when a file is saved, when an email is received, etc.). User information data store 116 may comprise a type indication for each item of user information stored therein. In other examples, user information data store 116 comprises a set of categories, each of which may be associated with the different types of user information. Other storage techniques may be used without departing from the aspects described herein. Further, while telemetry data generator 112 and user information detector 114 are illustrated as separate from software 110 in system 100, software 110, telemetry data generator 112, and/or user information detector 114 may be integrated with one another in other examples.

While system 100 is described with respect to identifying user information based on a set of user information stored by user information data store 116, it will be appreciated that, in other examples, user information may be evaluated dynamically. For example, potential user information may be determined from telemetry data (e.g., according to a pattern associated with a user information type, a data type indicated within the telemetry data, etc.), which may then be evaluated by user information detector 114 to determine whether the information matches user information stored by client device 104. Thus, rather than evaluating telemetry data in view of a stored set of user information (e.g., as may be stored by user information data store 116), user information detector 114 may alternatively or additionally search for instances of potential user information on client device 104 based on the content of telemetry data. It will be appreciated that the user information identification techniques described herein are provided as examples and that, in other examples, other techniques may be used as an alternative to or in addition to the techniques described herein.

User information detector 114 may evaluate telemetry data generated by telemetry data generator 112 contemporaneously with its creation, after telemetry data generator 112 has finished generating telemetry data for software 110, or according to a predetermined schedule, among other examples. If user information detector 114 identifies one or more instances of user information in telemetry data, user information detector 114 may gather diagnostic information relating to the identified user information. Example diagnostic information includes, but is not limited to, information usable to identify what caused the user information to be included in the telemetry data (e.g., a stack trace of software 110, a version of software 110, a name of software 110, an execution time, etc.), as well as an indication as to the type of user information that was included (e.g., a username, an email address, a street address, a file name, file content, etc.). Accordingly, in response to identifying user information, user information detector 114 may generate an execution state (e.g., a stack trace, a dump of at least a part of the memory used by software 110, etc.) associated with software 110 and incorporate the execution state into the diagnostic data. The user information type indication may be determined based on the set of user information stored by user information data store 116, which, as discussed above, may comprise a type indication and/or a category association for each item of user information stored therein.

When user information is identified in telemetry data, user information detector 114 may generate a warning indication according to aspects described herein. In examples, the warning indication comprises the diagnostic information described above. While the warning indication includes a user information type indication, it does not include the user information itself. For example, the warning indication indicates that an email address was found without including the actual email address. The warning indication is provided to server device 102 (e.g., telemetry data processing engine 106). In some instances, the telemetry data (e.g., as may be generated by telemetry data generator 112) is not provided to server device 102 or is otherwise suppressed, thereby ensuring that the user information therein does not leave client device 104. In other examples, user information detector 114 may censor instances of the user information in the telemetry data prior to transmission to server device 102. In another instance, the warning indication is provided to server device 102 in conjunction with the telemetry data (e.g., in its censored or uncensored form). While system 100 is illustrated as server device 102 receiving both the telemetry data and the warning indication, other examples may comprise transmitting telemetry data to one server device and transmitting the warning indication to a different server device.

In response to receiving the warning indication, server device 102 may process previously received telemetry data stored by telemetry data store 108 (e.g., to censor user information therein, to remove telemetry data, etc.). In another example, server device 102 may generate an indication as to the potential issue identified by the warning indication (e.g., comprising a user information type indication and/or an indication as to what caused the inclusion of the user data based on the diagnostic information), which may then be used by the developer of software 110 to correct the behavior of software 110. As discussed above, server device 102 may generate a block list entry or a rule that prevents the collection of similar telemetry data believed to comprise user information. If the issue is resolved, server device 102 may subsequently be configured to remove the rule or update the block list accordingly. It will be appreciated that example corrective actions are described herein and that, in other examples, alternative or additional actions may be taken by server device 102 and/or client device 104.

Figure 2:
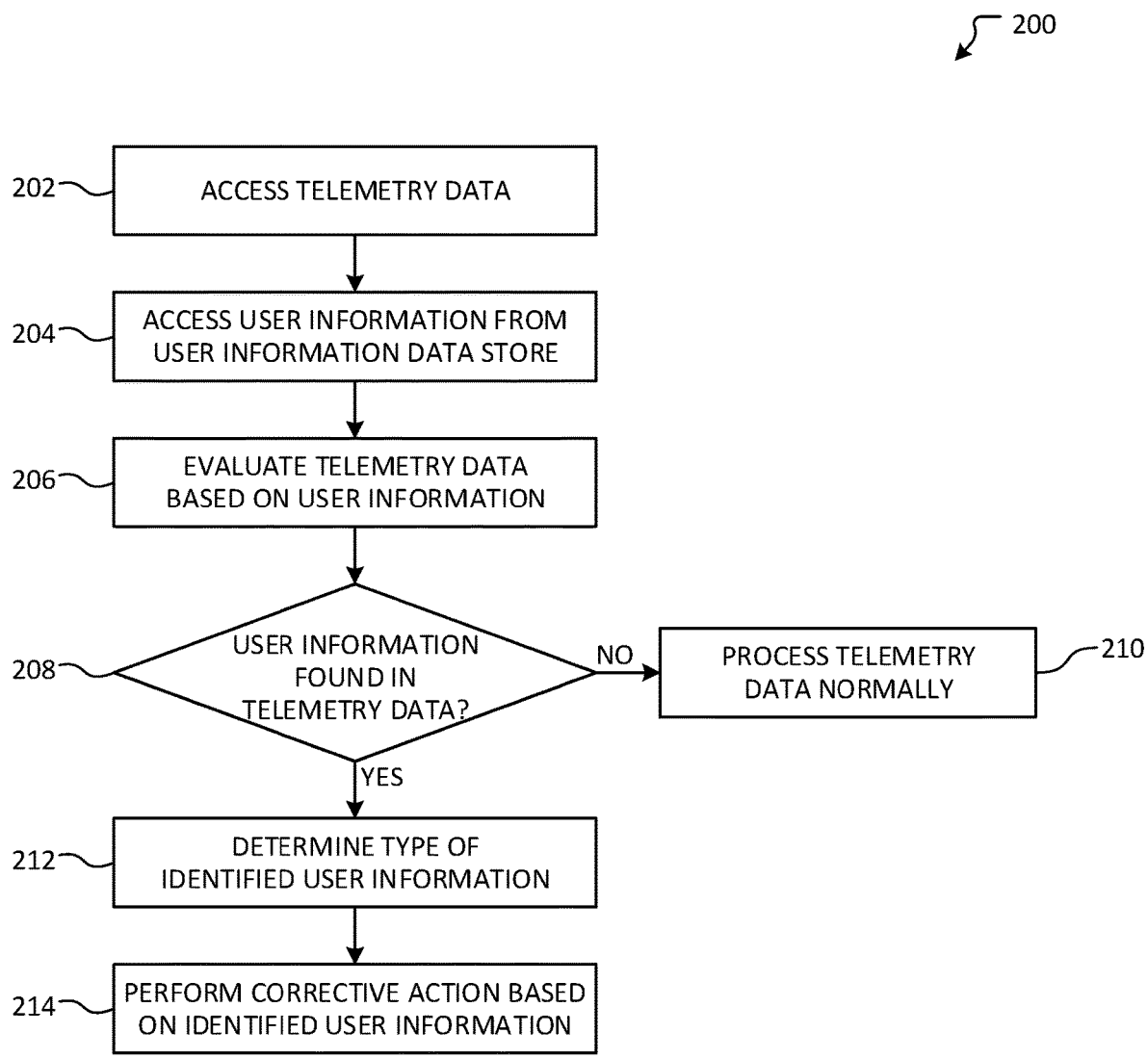
FIG. 2 illustrates an overview of an example method for evaluating telemetry data to identify user information therein and to perform a corrective action accordingly.

FIG. 2 illustrates an overview of an example method 200 for evaluating telemetry data to identify user information therein and to perform a corrective action accordingly. In examples, aspects of method 200 are performed by a user information detector, such as user information detector 114 in FIG. 1. Method 200 begins at operation 202, where telemetry data is accessed. Telemetry data may be accessed as it is generated by a telemetry data generator, such as telemetry data generator 112 in FIG. 1. As another example, telemetry data is accessed once it has been generated (e.g., from a local file, from memory, etc.). In some instances, telemetry data is received from a telemetry data generator (e.g., telemetry data generator 112 in FIG. 1) at operation 202. For example, the telemetry data generator may provide a subset of the telemetry data as it is being generated, such that it is analyzed according to method 200 contemporaneously with its generation. It will be appreciated that any of a variety of other techniques may be used to access telemetry data at operation 202.

Flow progresses to operation 204, where a set of user information is accessed from a user information data store. For example, the user information data store may be user information data store 116 in FIG. 1. As described above, each item of user information may have an associated user information type or may have been categorized by type in the user information data store.

At operation 206, the telemetry data received at operation 202 is evaluated according to the user information accessed at operation 204. As an example, the set of user information is used to identify instances of the user information within the telemetry data. Exact or fuzzy text matching techniques may be used to determine whether any instances of user information exist within the telemetry data. It will be appreciated that method 200 is described in an example where an existing set of user information is available. In other examples, the evaluation at operation 206 may comprise a dynamic analysis of potential user information identified within the telemetry data (as discussed above) to determine whether the potential user information within the telemetry data is user information stored on the client device. For example, the potential user information may be used to perform a search of the client device.

Moving to determination 208, it is determined whether user information is found in the telemetry data. If it is determined that user information was not found in the telemetry data, flow branches "NO" to operation 210, where the telemetry data is processed normally. In examples, operation 210 comprises taking no further action with respect to the received telemetry data and instead allowing the telemetry data to be transmitted to or accessed by a server device. Flow terminates at operation 210.

If, however, it is determined that user information is found in the telemetry data, flow instead branches "YES" to operation 212, where a user information type is determined for each instance of user information identified within the telemetry data. The determination may comprise evaluating a type indication or category association for each instance of user information based on a user information data store.

At operation 214, a corrective action is performed based on the identified user information. As described above, example corrective actions include, but are not limited to, generating and providing a warning indication (e.g., comprising diagnostic information, as described above) to a server device, preventing the transmission of the telemetry data, censoring the telemetry data, or transmitting a warning indication in combination with the telemetry data. Flow terminates at operation 214.

Figure 3:
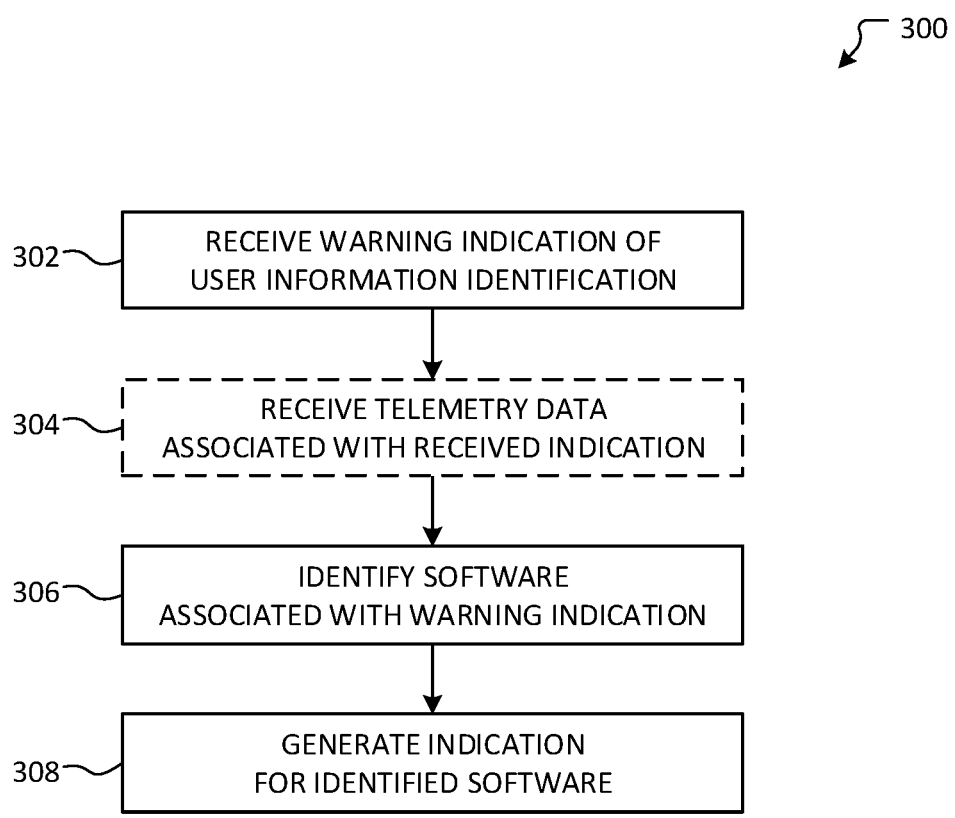
FIG. 3 illustrates an overview of an example method for performing a corrective action at a server in response to a received warning indication of identified user information.

FIG. 3 illustrates an overview of an example method 300 for performing a corrective action at a server in response to a received warning indication of identified user information. In examples, aspects of method 300 are performed by a server device, such as server device 102 in FIG. 1. As another example, aspects of method 300 may be performed by a telemetry data processing engine, such as telemetry data processing engine 106 in FIG. 1. Method 300 begins at operation 302, where a warning indication is received, indicating that user information was identified in telemetry data at a client device. In examples, the warning indication is generated by a user information detector, such as user information detector 114 performing aspects of method 200 in FIGS. 1 and 2, respectively. As discussed above, the received indication may comprise diagnostic information, including, but not limited to, an indication as to the type of user information that was identified in the telemetry data and/or an execution state associated with software execution that resulted in the user information being included in the telemetry data.

In examples, flow progresses to operation 304, where telemetry data is received. Operation 304 is illustrated with a dashed box to indicate that, in other examples, operation 304 is omitted, such that telemetry data is not received from the client device and flow instead progresses directly from operation 302 to operation 306. This may be the case when the user information detector prevents the transmission of telemetry data from the client device. As illustrated, the warning indication and telemetry data are received at separate operations. However, it will be appreciated that, in other examples, the warning indication and telemetry data may be received in the same operation.

Flow progresses to operation 306, where software associated with the warning indication is identified. In examples, the indication comprises evaluating an identifier received as part of the diagnostic information to identify a specific software package, a software version, and/or a developer, among other examples. Operation 306 may comprise using the received identifier to query a database or other mapping between the identifier and the software and/or the developer.

While example identification techniques are described herein, it will be appreciated that other techniques may be used without departing from the aspects described herein.

Moving to operation 308, an indication is generated for the identified software. In examples, the indication comprises generating an electronic communication for transmission to a developer associated with the software (e.g., via email, via text message, via instant message, etc.), as may have been determined at operation 306. In another example, the indication is stored by a website, thereby enabling the developer to access the indication and associated diagnostic information via the website. In examples, the indication comprises the type of user information that was identified in the telemetry data and information usable to identify a set of software instructions that caused the user information to be inadvertently included in the telemetry data. Such information may be at least a subset of the diagnostic information that was received as part of the warning indication at operation 302. It will be appreciated that a variety of other indications may be generated without departing from the aspects described herein. As a result of receiving the indication generated at operation 308, the software issue that resulted in the inadvertent inclusion of user information may be resolved, thereby avoiding the inadvertent collection of user information as part of telemetry data in similar instances in the future. Flow terminates at operation 308.

Figure 4:
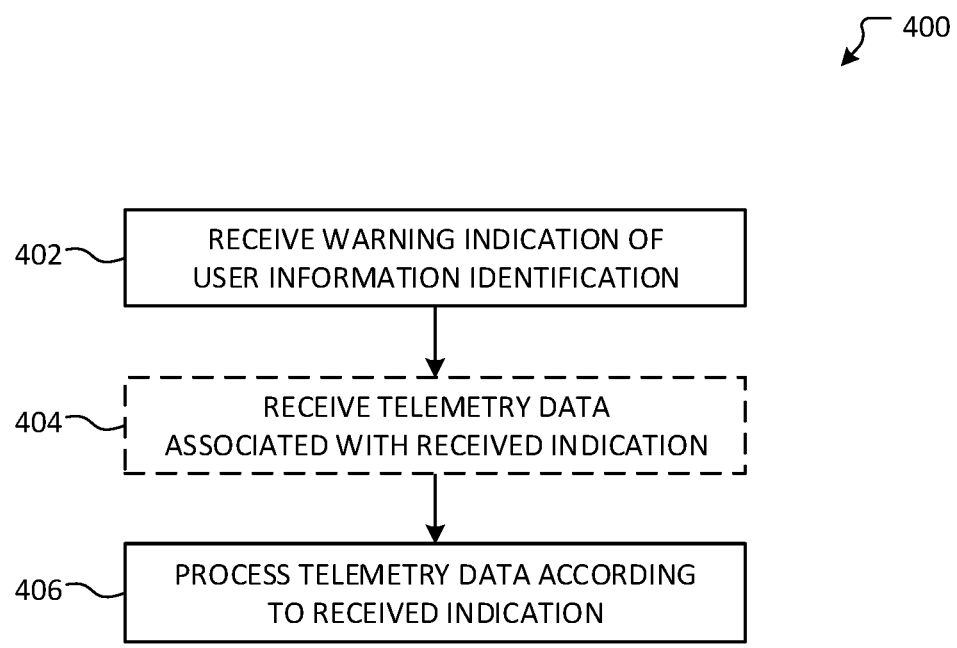
FIG. 4 illustrates an overview of another example method for performing a corrective action at a server in response to a received warning indication of identified user information.

FIG. 4 illustrates an overview of another example method 400 for performing a corrective action at a server in response to a received warning indication of identified user information. In examples, aspects of method 400 are performed by a server device, such as server device 102 in FIG. 1. As another example, aspects of method 400 may be performed by a telemetry data processing engine, such as telemetry data processing engine 106 in FIG. 1. Method 400 begins at operation 402, where a warning indication is received, indicating that user information was identified in telemetry data at a client device. In examples, the warning indication is generated by a user information detector, such as user information detector 114 performing aspects of method 200 in FIGS. 1 and 2, respectively. As discussed above, the received indication may comprise diagnostic information, including, but not limited to, an indication as to the type of user information that was identified in the telemetry data and/or an execution state associated with software execution that resulted in the user information being included in the telemetry data.

In examples, flow progresses to operation 404, where telemetry data is received. Operation 404 is illustrated with a dashed box to indicate that, in other examples, operation 404 is omitted, such that telemetry data is not received from the client device and flow instead progresses directly from operation 402 to operation 406. This may be the case when the user information detector prevents the transmission of telemetry data from the client device. As illustrated, the warning indication and telemetry data are received at separate operations. However, it will be appreciated that, in other examples, the warning indication and telemetry data may be received in the same operation.

Flow progresses to operation 406, where telemetry data is processed according to the indication received at operation 402. In examples, the telemetry data is stored in a telemetry data store, such as telemetry data store 108 in FIG. 1. Operation 406 may comprise identifying telemetry data in the telemetry data store that is associated with the received warning indication, for example based on an identifier associated with the software, software version, and/or software developer, among other examples. In instances where operation 404 is performed, the telemetry data processed at operation 406 may further comprise the telemetry data received at operation 404.

As discussed above, the warning indication comprises a type of user information, such that the telemetry data may be analyzed according to a pattern associated with the user information type (e.g., matching an email address, a mailing address, a computer host name, etc.) to remove or otherwise censor any inadvertently collected user information. As an example, identified user information may be replaced with an indication as to the type of user information, or the identified user information may be omitted. It will be appreciated that alternative techniques may be used to process the telemetry data at operation 406. For example, the warning indication received at operation 402 may comprise an indication as to a location at which customer identification is expected to be present within the telemetry data (e.g., according to a line number, a column number, a pattern of characters, etc.), which may be used to process the telemetry data accordingly. Flow terminates at operation 406.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
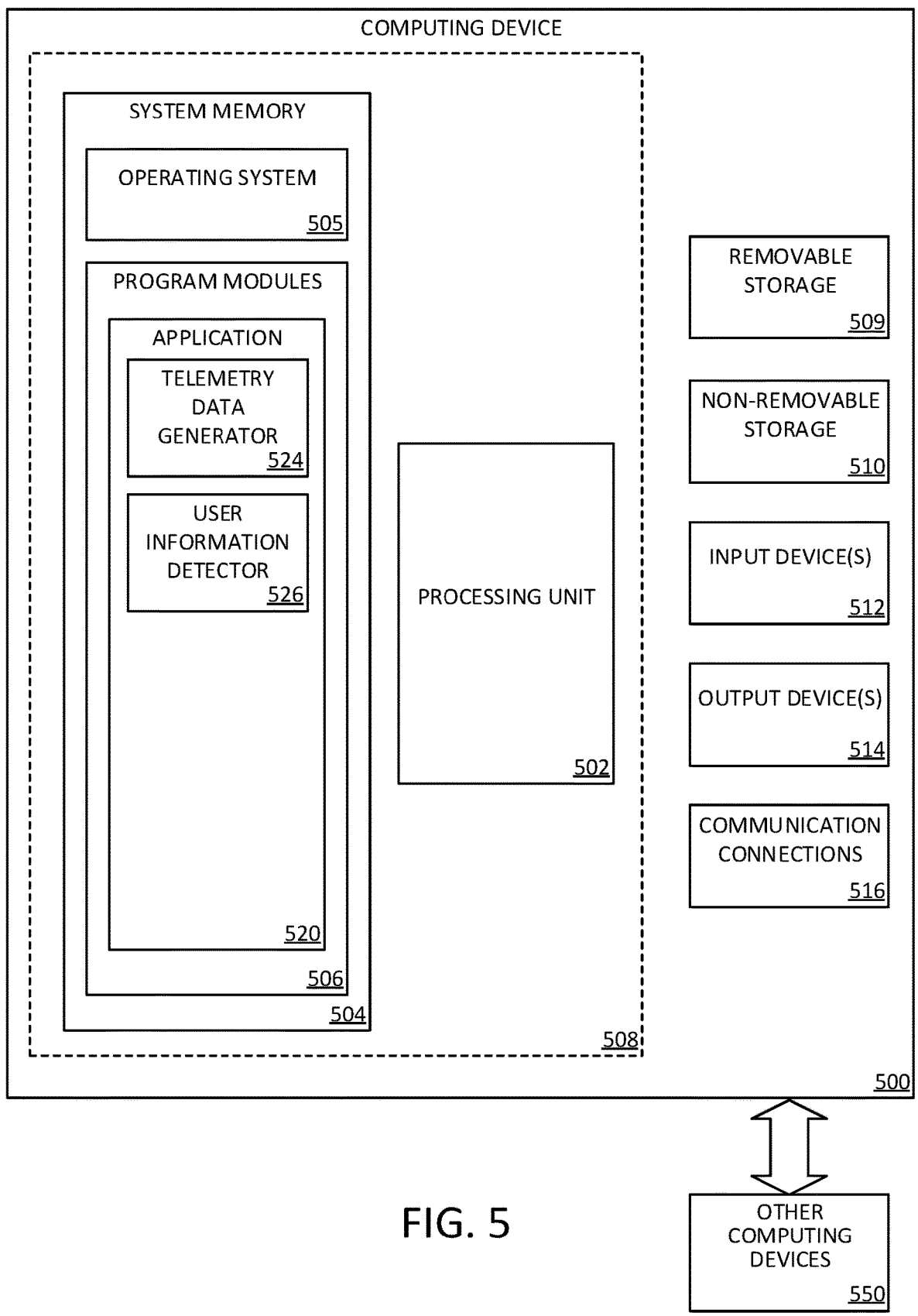
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including the devices 102 and 104 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store telemetry data generator 524 and user information detector 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
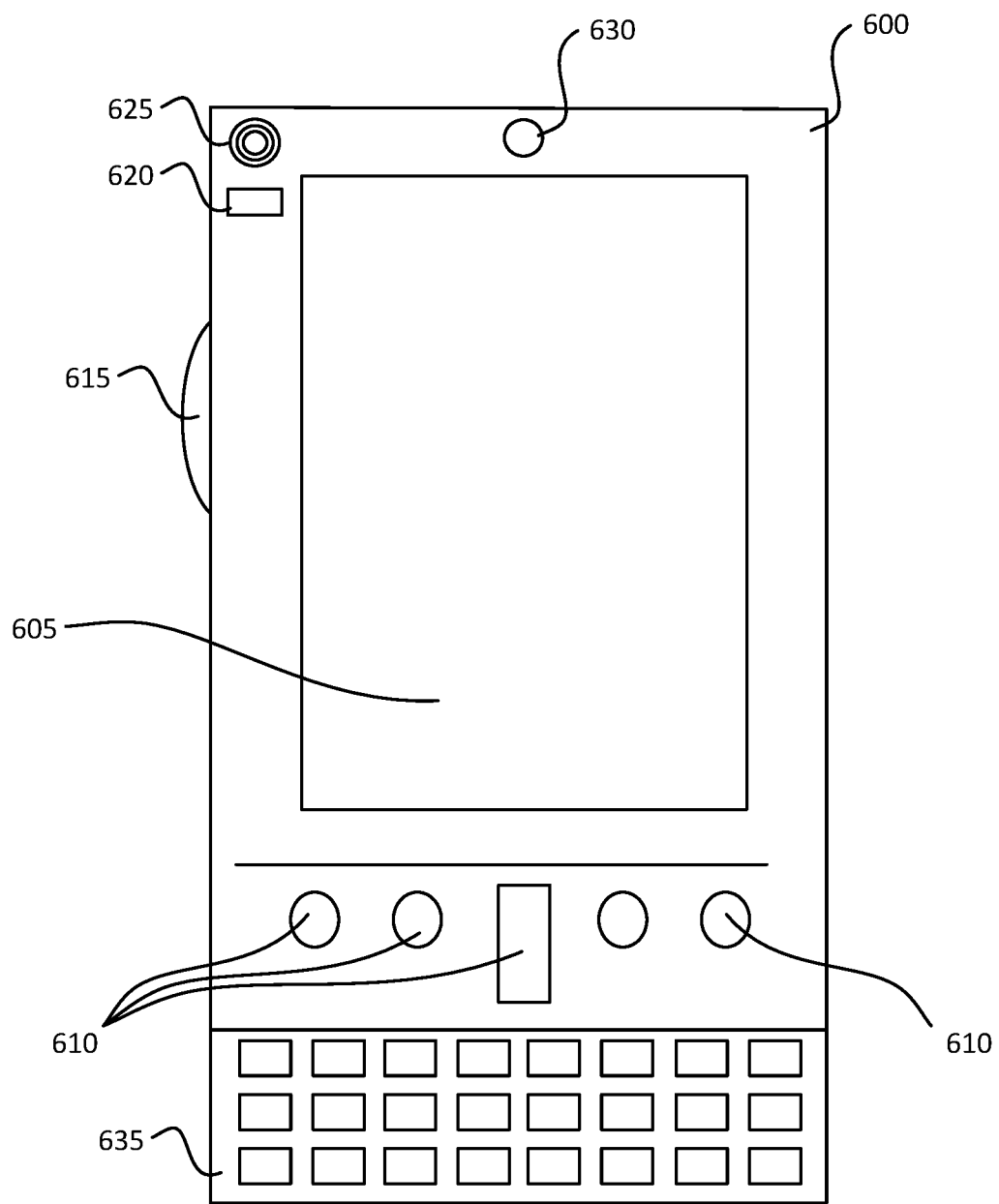
FIGS. 6A and 6B are simplified block diagrams of a mobile computing device with which aspects of the present disclosure may be practiced.
Figure 6B:
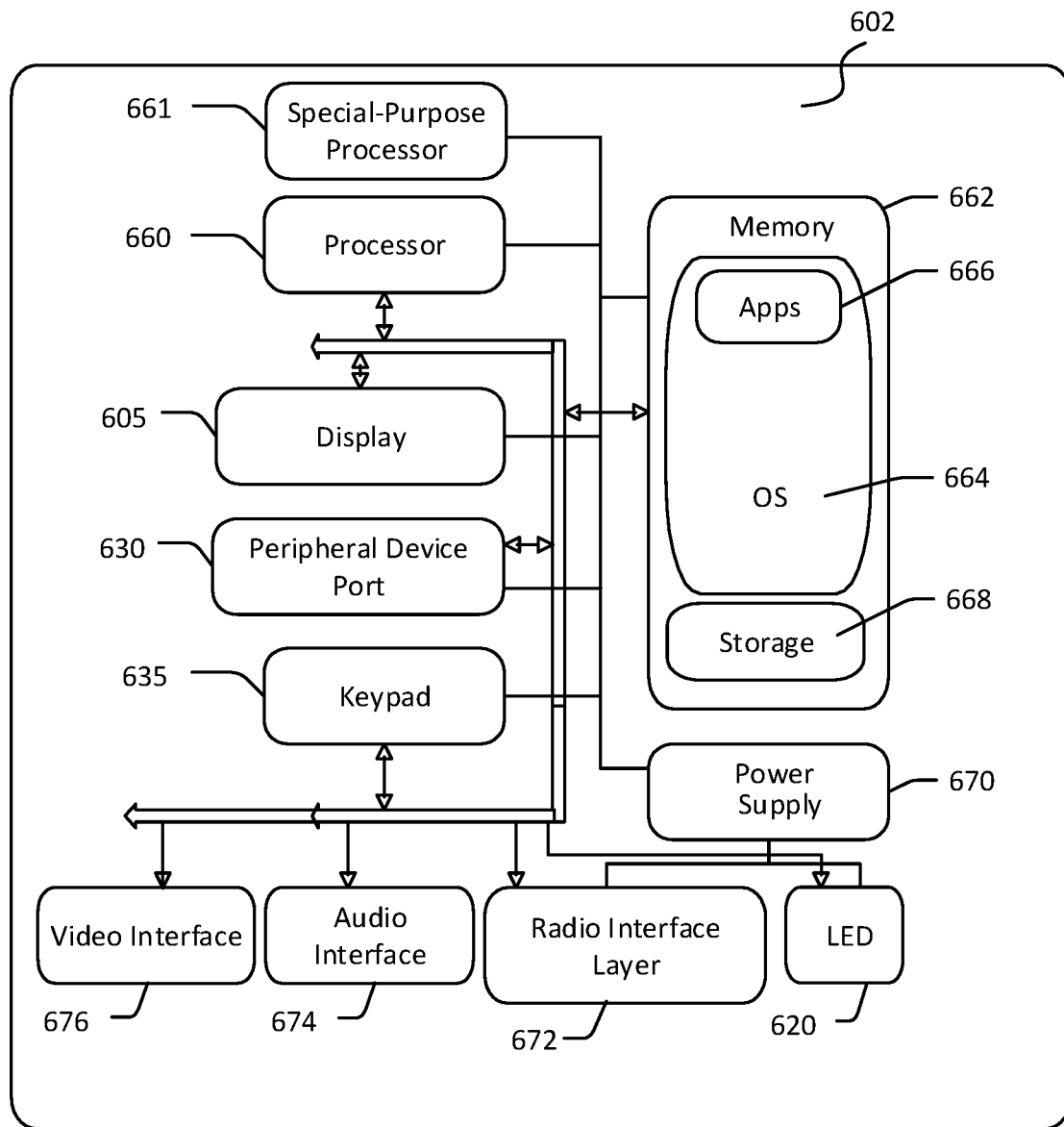

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
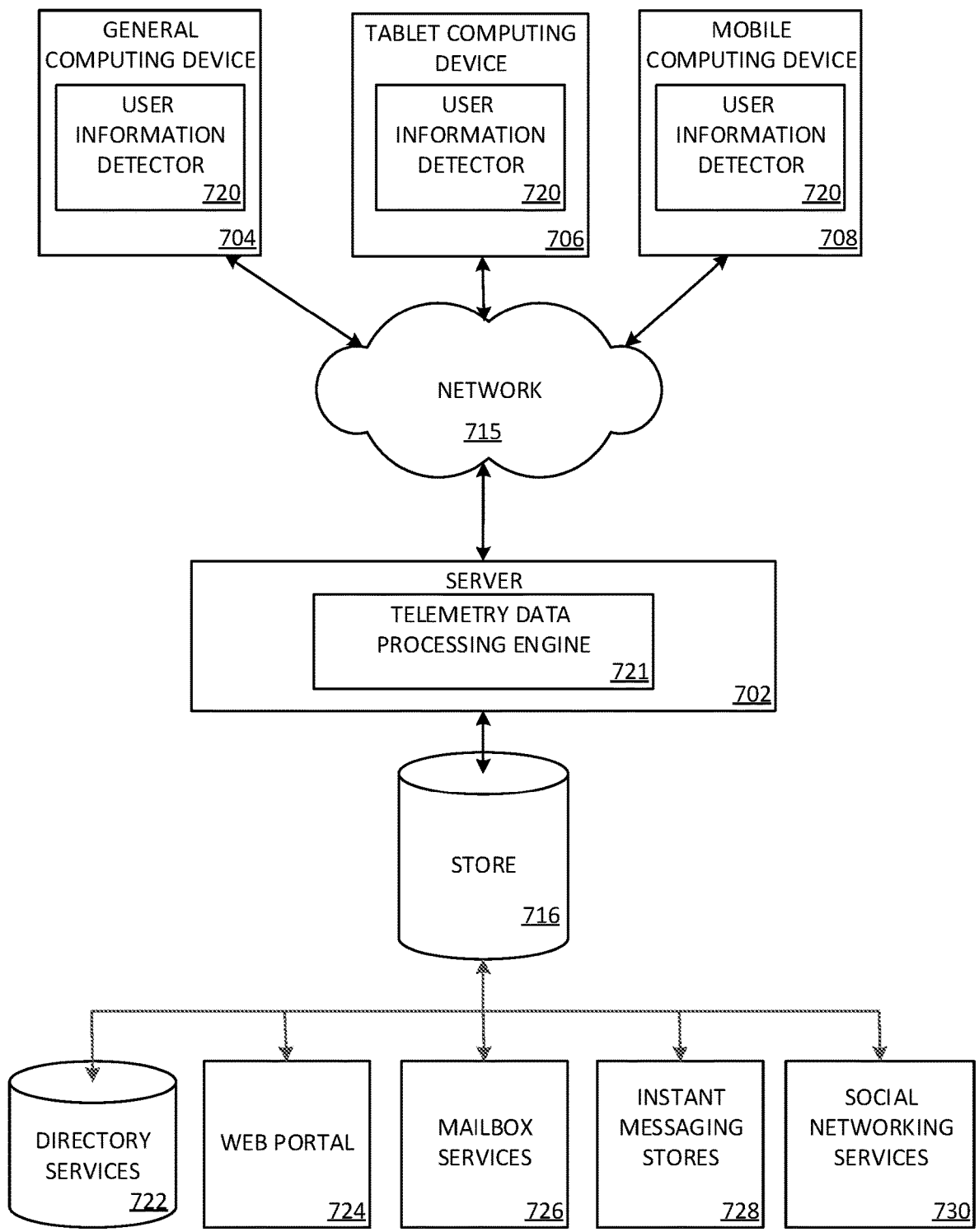
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A user information detector 720 may be employed by a client that communicates with server device 702, and/or the telemetry data processing engine 721 may be employed by the server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
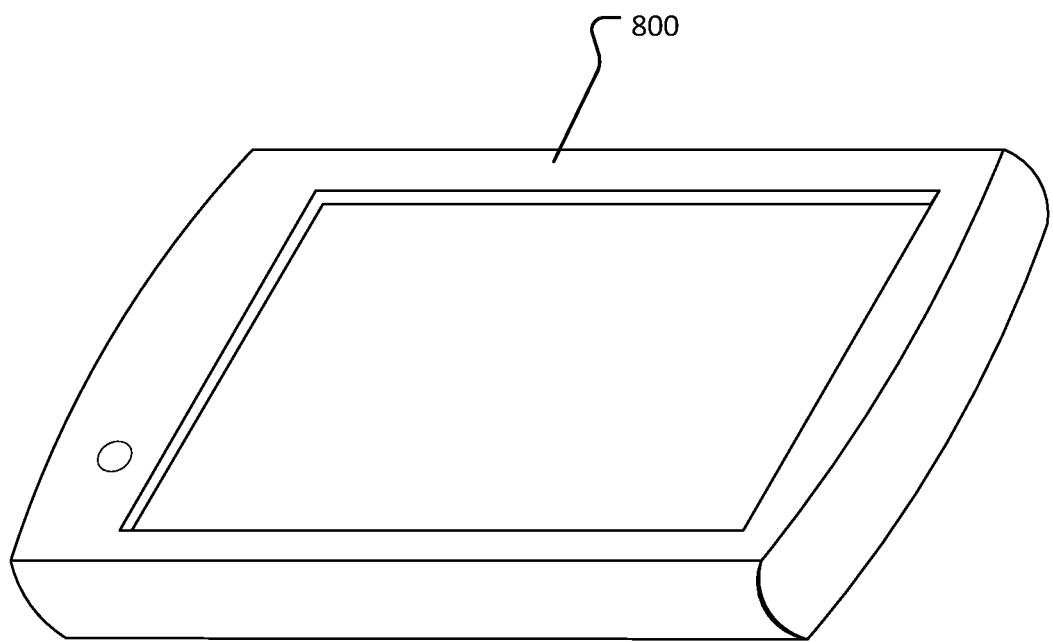
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: generating a set of user information associated with at least one of the system or a user of the system; accessing telemetry data of software on the system; determining whether the telemetry data comprises an instance of user information from the set of user information; based on determining the telemetry data comprises the instance of user information: generating a warning indication comprising a type indication for the instance of user information and diagnostic information for the software; and transmitting the warning indication to a server device. In an example, the set of operations further comprises: based on determining that the telemetry data comprises the instance of user information, causing the telemetry data to not be transmitted. In another example, transmitting the warning indication further comprises transmitting the telemetry data. In a further example, the transmitted telemetry data is a representation of the telemetry data that omits at least the instance of user information. In yet another example, the representation of the telemetry data further comprises the type indication for the instance of user information. In a further still example, determining whether the telemetry data comprises an instance of user information from the set of information comprises: for each item of user information in the set of user information: searching the telemetry data to determine if the item of user information is in the telemetry data; and when the item of user information is identified in the telemetry data, determining that the telemetry data comprises the instance of user information. In an example, the diagnostic information comprises an execution state of the software.

In another aspect, the technology relates to a method for processing a warning indication at a server device. The method comprises: receiving, from a client device, a warning indication that an instance of user information was identified in telemetry data at the client device, the warning indication comprising a type indication for the instance of user information and diagnostic information for software; determining contact information associated with a developer of the software; generating an electronic communication comprising the type indication and at least a part of the diagnostic information; and transmitting the electronic information to the developer of the software using the contact information. In an example, the method further comprises: generating a rule based on the warning indication; receiving telemetry data associated with the software; and rejecting, based on the rule, the received telemetry data. In another example, the method further comprises: identifying stored telemetry data associated with the software; and processing the stored telemetry data to remove instances of user information in the telemetry data based on the type indication in the warning indication. In a further example, removing instances of user information further comprises replacing the instances of user information with the type indication. In yet another example, the method further comprises: rejecting telemetry data from the client device based on the warning indication. In a further still example, the warning indication is received from the client device without receiving the telemetry data.

In another aspect, the technology relates to another method for processing telemetry data at a client device. The method comprises: generating a set of user information associated with at least one of the system or a user of the client device; accessing telemetry data of software on the client device; determining whether the telemetry data comprises an instance of user information from the set of user information; based on determining the telemetry data comprises the instance of user information: generating a warning indication comprising a type indication for the instance of user information and diagnostic information for the client device; and transmitting the warning indication to a server device. In an example, the method comprises: based on determining that the telemetry data comprises the instance of user information, causing the telemetry data to not be transmitted. In another example, transmitting the warning indication further comprises transmitting the telemetry data. In a further example, the transmitted telemetry data is a representation of the telemetry data that omits at least the instance of user information. In yet another example, the representation of the telemetry data further comprises the type indication for the instance of user information. In a further still example, determining whether the telemetry data comprises an instance of user information from the set of information comprises: for each item of user information in the set of user information: searching the telemetry data to determine if the item of user information is in the telemetry data; and when the item of user information is identified in the telemetry data, determining that the telemetry data comprises the instance of user information. In an example, the diagnostic information comprises an execution state of the software.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:
1. A system comprising:
at least one processor; and
memory storing instructions that, when executed by the at least one processor, causes the system to perform a set of operations, the set of operations comprising:
generating a set of user information associated with at least one of the system or a user of the system;
accessing telemetry data of software on the system;
determining whether the telemetry data comprises an instance of user information from the set of user information;
based on determining the telemetry data comprises the instance of user information:
generating a warning indication comprising a type indication for the instance of user information and diagnostic information for the software; and
transmitting the warning indication to a server device.

2. The system of claim 1, wherein the set of operations further comprises:
based on determining that the telemetry data comprises the instance of user information, causing the telemetry data to not be transmitted.

3. The system of claim 1, wherein transmitting the warning indication further comprises transmitting the telemetry data.

4. The system of claim 3, wherein the transmitted telemetry data is a representation of the telemetry data that omits at least the instance of user information.

5. The system of claim 4, wherein the representation of the telemetry data further comprises the type indication for the instance of user information.

6. The system of claim 1, wherein determining whether the telemetry data comprises an instance of user information from the set of information comprises:
for each item of user information in the set of user information:
searching the telemetry data to determine if the item of user information is in the telemetry data; and
when the item of user information is identified in the telemetry data, determining that the telemetry data comprises the instance of user information.

7. The system of claim 1, wherein the diagnostic information comprises an execution state of the software.

8. A method for processing a warning indication at a server device, comprising:
receiving, from a client device, a warning indication that an instance of user information was identified in telemetry data at the client device, the warning indication comprising a type indication for the instance of user information and diagnostic information for software;
determining contact information associated with a developer of the software;
generating an electronic communication comprising the type indication and at least a part of the diagnostic information; and
transmitting the electronic information to the developer of the software using the contact information.

9. The method of claim 8, further comprising:
generating a rule based on the warning indication;
receiving telemetry data associated with the software; and
rejecting, based on the rule, the received telemetry data.

10. The method of claim 8, further comprising:
identifying stored telemetry data associated with the software; and
processing the stored telemetry data to remove instances of user information in the telemetry data based on the type indication in the warning indication.

11. The method of claim 10, wherein removing instances of user information further comprises replacing the instances of user information with the type indication.

12. The method of claim 8, further comprising:
rejecting telemetry data from the client device based on the warning indication.

13. The method of claim 8, wherein the warning indication is received from the client device without receiving the telemetry data.

14. A method for processing telemetry data at a client device, comprising:
generating a set of user information associated with at least one of a system or a user of the client device;
accessing the telemetry data of software on the client device;
determining whether the telemetry data comprises an instance of user information from the set of user information;
based on determining the telemetry data comprises the instance of user information:
generating a warning indication comprising a type indication for the instance of user information and diagnostic information for the client device; and
transmitting the warning indication to a server device.

15. The method of claim 14, further comprising:
based on determining that the telemetry data comprises the instance of user information, causing the telemetry data to not be transmitted.

16. The method of claim 14, wherein transmitting the warning indication further comprises transmitting the telemetry data.

17. The method of claim 16, wherein, after the telemetry data is transmitted, the telemetry data is a representation of the telemetry data that omits at least the instance of user information.

18. The method of claim 17, wherein the representation of the telemetry data further comprises the type indication for the instance of user information.

19. The method of claim 14, wherein determining whether the telemetry data comprises an instance of user information from the set of information comprises:
for each item of user information in the set of user information:
searching the telemetry data to determine if the item of user information is in the telemetry data; and
when the item of user information is identified in the telemetry data, determining that the telemetry data comprises the instance of user information.

20. The method of claim 14, wherein the diagnostic information comprises an execution state of the software.

* * * * *